Patented Jan. 7, 1930

1,742,648

UNITED STATES PATENT OFFICE

GEORGE W. COGGESHALL AND ARTHUR REILLY, OF WASHINGTON, DISTRICT OF COLUMBIA, ASSIGNORS TO THE JEFFERSON CONSTRUCTION AND OIL TREATING COMPANY, OF WASHINGTON, DISTRICT OF COLUMBIA, A CORPORATION OF THE DISTRICT OF COLUMBIA

SEPARATING OILY EMULSIONS

No Drawing.   Application filed July 1, 1927. Serial No. 202,977.

The present invention relates to treatment of oil emulsions and has particular reference to the treatment of petroleum oil emulsions such as B. S., and embraces the employment of the sulfonic acids, which can be produced from sludge formed in treating mineral oil with sulfuric acid, these sulfonic acids being employed either directly, or in the form of the salts of these acids or the acids liberated from the salts during treatment of the B. S. with the sulfonic acid salts or after the mixing of the B. S. with the sulfonic acid salts.

The sulfonic acid or its salts have heretofore been recovered from the acid sludge produced in the refining and treatment of mineral oil, a number of patents having already been issued to Petroff and Divine, of which we mention particularly Nos. 1,196,274 and 1,303,779 and it is accordingly believed unnecessary in this application to describe in detail the production of the sulfonic acids or their salts, from the acid sludge or from petroleum.

The sulfonic acids can be mixed with or dissolved in water or kerosene or other oils or solvents before being added to the emulsion to be treated, the sulfonic acids being so applied, either as such or in the form of their alkali or alkaline earth metal salts. The sodium salts of the said acids are usually preferred.

In carrying out our process we first mix with the emulsion to be treated, the solution or suspension of the acids above referred to (or the solution or suspension of the salts above referred to, which may be followed by a sufficient amount of a mineral acid, such as hydrochloric or sulfuric, to decompose the salts and set the acids free within the body of the emulsion).

In a particular example we add to each 1000 barrels of the oil, about 18 barrels of an aqueous solution of the sodium salts of the sulfonic acids derived from the treatment of acid sludge (such solution being of, say 10% strength) the two liquids being well incorporated by a suitable mixing operation after the addition of sufficient acid thereto to convert the salt of sulphonic acid into free sulphonic acid. This corresponds to about 1.4 lbs. of the reagent to 100 gallons of the emulsion (B. S.). We then pass the mixture into a deep settling tank, preferably one in which the layer of mixture will be at least 10 or 12 feet in depth, and we then allow the entire mixture to stand until sedimentation has occurred, which may require up to two to five days. The quantity mentioned in this example has been found to be a convenient amount to use for the treatment of ordinary B. S., to give a reasonably rapid separation of the oil from the water. However, if it is desired to secure quicker results, this can be readily accomplished by materially increasing the percentage of the sulfonic acid compounds added.

It is to be understood that the entire process is conducted at ordinary atmospheric temperature, namely, without heating the materials by any extraneous heat.

We claim:—

1. The process of breaking petroleum oil emulsions, which comprises intermixing therewith dispersed compounds containing salts of sulphonic acid, said compounds having been recovered from sludge resulting from the treatment of mineral oils with acid, said compounds being added in small proportion, adding sufficient mineral acid to cause substantially all of the salts of sulphonic acid to be converted into free sulphonic acid within the emulsion, and allowing settling to take place, the entire process being conducted at ordinary atmospheric temperature.

2. The process of breaking petroleum oil emulsions, which comprises intermixing therewith dispersed compounds containing salts of sulphonic acid, said compounds having been recovered from sludge resulting from the treatment of mineral oils with acid, said compounds being added in the proportion of about 1.4 pounds to 100 gallons of the emulsion, adding sufficient mineral acid to cause substantially all of the salts of sulphonic acid to be converted into free sulphonic acid within the emulsion, and allowing settling to take place, the entire process being conducted at ordinary atmospheric temperature.

In witness whereof, we have hereunto set our hands at Washington, District of Columbia, this twenty-sixth day of May, A. D. nineteen hundred and twenty-seven.

ARTHUR REILLY.
GEORGE W. COGGESHALL.